Patented Oct. 2, 1923.

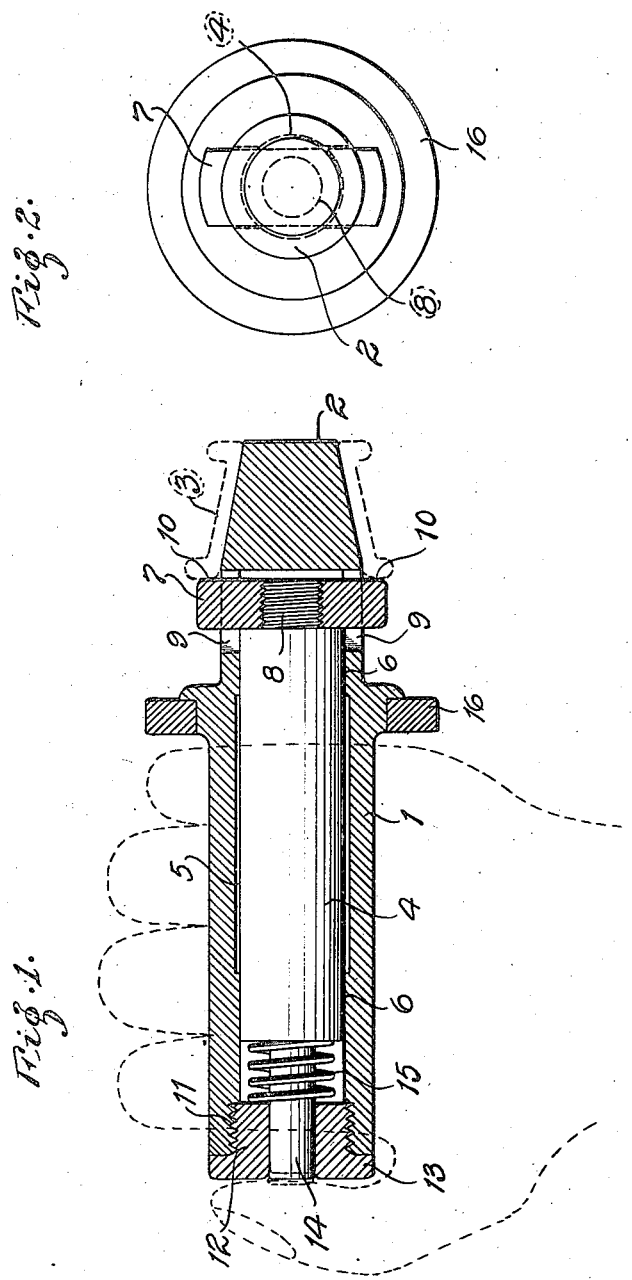

1,469,343

UNITED STATES PATENT OFFICE.

ERNEST G. STRONG, OF CANTON, OHIO, ASSIGNOR TO TIMKEN ROLLER BEARING COMPANY, OF CANTON, OHIO, A CORPORATION OF OHIO.

PLUG GAUGE.

Application filed November 1, 1922. Serial No. 598,297.

*To all whom it may concern:*

Be it known that I, ERNEST G. STRONG, a citizen of the United States, and a resident of the city of Canton, in the county of Stark and State of Ohio, have invented a new and useful Improvement in Plug Gauges, of which the following is a specification.

My invention relates to plug gauges and has for its principal object to produce a gauge that can be read by the sense of touch, and by means of which it can be easily and accurately determined whether the conical bore of a roller bearing cone or the like is properly sized.

The invention consists principally in a plug having a relatively movable indicating member that can be read by feeling with the thumb or a finger. The invention further consists in the plug gauge and in the parts and combinations of parts hereinafter described and claimed.

In the accompanying drawing,

Fig. 1 is a longitudinal sectional view of a plug embodying my invention; and

Fig. 2 is an end view thereof.

The plug gauge comprises a handle 1 having a conical end 2 that is inserted in the conical bore of a roller bearing cone 3 or other article, a roller bearing cone being indicated in dotted lines in Fig. 1.

The handle 1 has a bore that is in axial alinement with the conical end and in said bore fits a plunger 4. The bore may be enlarged through most of its length 5 leaving comparatively small portions 6 that fit the plunger and constitute guides therefor.

A cross piece 7 is mounted at the end of the plunger 4 as by means of a threaded portion of the plunger 8 extending into a screw threaded hole in the cross piece. The handle 1 is provided with slots 9 through which the ends of the cross piece project. The end portions 10 of the face toward the conical end of the plug are hardened and provided with very smooth surfaces that lie in a plane perpendicular to the axis of the plunger 4.

The end 11 of the handle is screw threaded to receive the threaded portion of a cap 12 that has a flange 13 overlapping the end of the handle. The cap 12 has a bore in axial alinement with the bore of the handle and the end portion 14 of the plunger 4 is reduced to form a pin that projects axially from the end of said plunger and fits in the bore of said cap. Mounted on the pin 14 between the cap 12 and the shoulder on the plunger 4 is a helical spring 15. The end of the reduced portion of the plunger and the face of the cap are preferably smoothed or polished. The handle is provided with a rib 16 to prevent the hand of the user from slipping.

The plug gauge is used as follows:

The handle is grasped by the hand of the user as indicated in dotted lines in Fig. 1 and the conical end is inserted in the conical bore of a roller bearing cone or the like. This may be done while the cone is in a grinding machine or other machine that sizes the bore thereof. The ends of a face of the cross piece abut against the end of the cone. The larger the bore of the cone, the further the conical end of the plug can be inserted into it, and the greater will be the relative movement of the plunger and handle. In practice the plug gauge is so constructed that when the bore of the cone being gaged is undersized, the end of the plunger falls short of reaching the face of the cap; when the bore is correctly sized, the end of the plunger is exactly flush with the face of the cap; and when the bore is oversized, the end of the plunger projects beyond the face of the cap.

The position of the plunger relative to the handle is perceived by rubbing the thumb or a finger across the end of the handle. The thumb and fingers are, of course, very sensitive, so that slight differences in the relative position of the plunger and cap are easily perceived and the size of the bore of the cone is easily and accurately gaged.

The plug gauge above described has numerous advantages. It is simple and easy to operate. It eliminates the necessity for reading a scale or observing the movement of a pointer. It requires the use of only one hand.

Obviously numerous changes may be made without departing from the invention and I do not wish to be limited to the precise construction shown.

What I claim is:

1. A gauge for gaging the conical bore of roller bearing cones and the like, comprising a handle having a conical end and a longitudinal bore extending through the opposite end, and a member movable endwise in said bore by the article being gaged and of such length that its end is substantially flush with the end of the handle when a normal article is gaged whereby the position of said member and the bore of the article may be determined by the sense of touch.

2. A plug gauge comprising a handle having a conical end and a bore extending through the other end thereof, and a plunger movable endwise in said bore and provided with a member that is adapted to abut against the article being gaged to be moved thereby, said plunger being so related to said handle that the end of the plunger will be substantially flush with the surface of the handle when said plunger is moved by articles of correct size.

3. A plug gauge comprising a handle having a conical end and a bore in axial alinement with said conical end, a plunger fitting in said bore and movable endwise thereof, a crosspiece removably secured at the end of said plunger, said crosspiece projecting through elongated holes provided therefor in said handle and having a face in a plane perpendicular to the axis of said handle and being adapted to abut against the article being gaged, and yieldable means tending to keep said crosspiece adjacent to the conical end of the handle, whereby said plunger is responsive to the size of the bore of the article being gaged and said size is determined by feeling the position of the plunger relative to the handle.

4. A plug gauge comprising a handle having a conical end and a bore in axial alinement with said conical end, a plunger fitting in said bore and movable endwise thereof and a crosspiece secured at the end of said plunger, said crosspiece projecting through holes provided therefor in said handle and having a face in a plane perpendicular to the axis of said handle and being adapted to abut against the article being gaged, whereby said plunger is responsive to the size of the bore of the article being gaged and said size is determined by feeling the position of the plunger relative to the handle.

5. A plug gauge comprising a handle having a conical end and a bore in axial alinement with said conical end, a cap in the end of said handle, said cap having an axial bore, a plunger fitting in the bore of said handle and having a reduced portion extending into the bore of said cap, said plunger being movable endwise of said handle, and provided with a member that is adapted to abut against the article being gaged, whereby said plunger is responsive to the size of the bore of the article being gaged and said size is determined by feeling the position of the end of the plunger relative to the surface of said cap.

6. A plug gauge comprising a handle having a conical end and a bore in axial alinement with said conical end, a cap in the end of said handle, said cap having an axial bore, a plunger fitting in the bore of said handle and having a reduced portion extending into the bore of said cap, said plunger being movable endwise of said handle and provided with a member that is adapted to abut against the article being gaged, and a spring on the reduced portion of said plunger bearing against said cap and the body portion of the plunger, whereby said plunger is responsive to the size of the bore of the article being gaged and said size is determined by feeling the position of the end of the plunger relative to the surface of said cap.

7. A plug gauge comprising a conical plug adapted to be inserted in the conical bore of an article to gauge the same, a handle therefor, and a member movable relative to said handle and adapted to abut against the article being gaged to be moved thereby, said handle having a surface transverse to the axis of said movable member and in position to be pressed by the thumb of the hand that grasps said handle and said member having a surface that becomes flush with said first named surface when articles with normal size bores are gaged.

8. A plug gauge comprising a handle having a conical end and a bore in axial alinement with said conical end, a cap in the end of said handle opposite said conical end, said cap having an axial bore, a plunger fitting in the bore of said handle and having a reduced portion extending into the bore of said cap, said plunger being movable endwise of said handle and being provided with a crosspiece, said crosspiece projecting through elongated holes provided therefor in said handle and being adapted to abut against the end of the article being gaged, whereby the plunger is responsive to the size of the bore of the article being gaged, the end of the plunger and the end of the cap being flush when the conical end is inserted in the bore of an article that is correctly sized.

9. A plug gauge comprising a handle having a conical end and a bore in axial alinement with said conical end, a cap in the end of said handle opposite said conical end, said cap having an axial bore, a plunger fitting in the bore of said handle and having a reduced portion extending into the bore of said cap, said plunger being movable endwise of said handle and being provided with a crosspiece, said crosspiece projecting through elongated holes provided therefor in said handle and being adapted to abut against the end of the article being gaged, and a spring adapted to press the plunger toward the conical end of the handle, whereby the plunger is responsive to the size of the bore of the article being gaged, the end of the plunger and the end of the cap being flush when the conical end is inserted in the bore of an article that is correctly sized.

Signed at Canton, Ohio, this 25th day of October, 1922.

ERNEST G. STRONG.